No. 772,025.

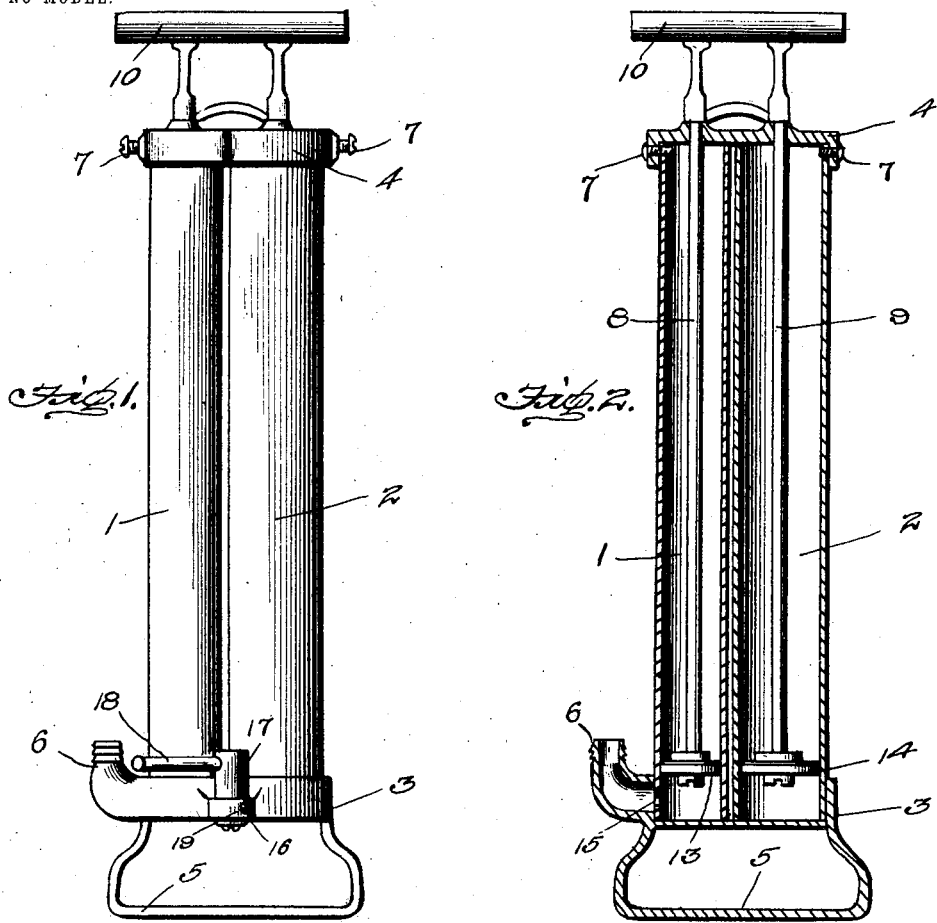
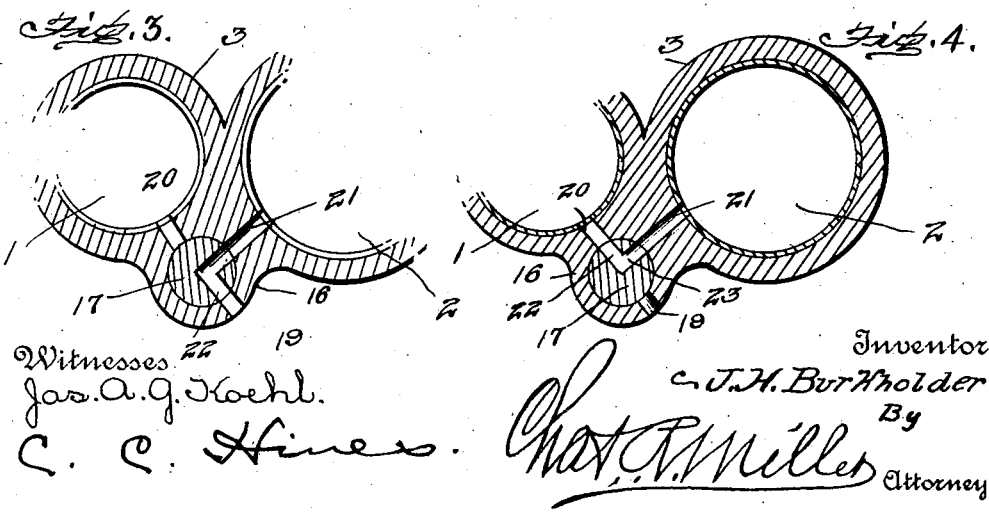

Patented October 11, 1904.

UNITED STATES PATENT OFFICE.

JOHN H. BURKHOLDER, OF ASHLAND, OHIO, ASSIGNOR TO WILLIAM V. B. TOPPING AND GUY C. BOWMAN, OF ASHLAND COUNTY, OHIO.

AIR-PUMP.

SPECIFICATION forming part of Letters Patent No. 772,025, dated October 11, 1904.

Application filed September 24, 1902. Serial No. 124,656. (No model.)

*To all whom it may concern:*

Be it known that I, JOHN H. BURKHOLDER, a citizen of the United States, residing at Ashland, in the county of Ashland and State of Ohio, have invented new and useful Improvements in Air-Pumps, of which the following is a specification.

This invention relates to air-pumps of the hand-operated type designed for use in inflating pneumatic tires and for other like purposes.

The object of the invention is to provide a pump of this character in which two pump-cylinders are connected to operate in unison and in which means are provided to enable air-pressure from one or both to be forced into the tire, whereby at the beginning of the operation of inflating a tire a large amount of air may be forced therein until the tire is inflated to near the desired pressure, when a smaller quantity of air may be supplied until the required pressure is reached. This mode of operation renders the action of pumping easier to the operator and at the same time enables him to properly graduate the supply of air to the tire, obviating all liability of bursting the tire by forcing therein an excess quantity of air.

With this and other objects in view the invention consists in certain features of construction and combination of parts, which will be hereinafter fully set forth.

In the accompanying drawings, Figure 1 is a side elevation of a pump constructed in accordance with this invention. Fig. 2 is a vertical longitudinal section of the same. Figs. 3 and 4 are horizontal sections through a portion of the base and the valve, showing the latter in its two operative positions.

In the operation of inflating pneumatic tires with air by the action of a pump of a given or invariable capacity two objections are encountered: first, that of the increasing difficulty of operating the pump as the pressure of the air within the tire increases, and, second, the practical impossibility of graduating the supply of air as the pressure reaches the maximum, due to the fact that the same quantity of air is forced into the tire on each working stroke of the pump. Hence the operator is not only subjected to considerable labor in inflating his tire, but is not always able to inflate the tire to the desired hardness, and unless employing more than ordinary care is liable to inflate the tire to an excess extent, resulting not infrequently in the bursting of the tire.

The present invention contemplates the provision of a pump which will enable the operator at the outset and until a certain pressure is reached to force a large supply of air into the tire, and then as the pump becomes difficult to work and the pressure approximates the limit to force a smaller amount of air into the tire, thus rendering the process of inflation easier and at the same time enabling the amount of air supplied to be graduated until the desired pressure is reached, thereby obviating all liability of the supply of an excess amount of air to the tire.

Referring now more particularly to the drawings, the numerals 1 and 2 represent pump-cylinders of different diameters which are connected together by a base 3 and head 4. The base 3 is formed with a stirrup 5 for the reception of the foot of the operator in holding the pump stationary and is provided with a nipple 6 for the attachment of the usual flexible tube whereby air is conveyed to the tire in the ordinary manner. The head 4 is in the form of a double cap or socket which fits down upon the upper ends of the two cylinders and is secured thereto by screws or other similar fastening devices 7. The base 3 is formed with seats or recesses to receive the lower ends of the two cylinders which are firmly secured thereto in any suitable manner. The cylinders are provided with the plunger-rods 8 and 9, which work loosely through the head 4 and are connected together at their upper ends, so as to operate in unison, by a suitable handle 10. At their lower ends the rods are provided with plungers 13 and 14, which may be of any ordinary construction and which operate within the cylinders for forcing air therefrom in the usual way. The smaller cylinder 1 is in communication through an always-open passage 15 with the nipple 6, while the larger cylinder is not in direct communication either with the nipple or said smaller cylinder, but has an indirect communication through valve-controlled passages, which will now be described.

On the base 3 is formed an enlargement 16, which is suitably apertured to form a seat for a plug-valve 17, having an operating-handle 18. This enlargement 16 is formed with a port 19 in normal communication with the atmosphere and the valve-chamber is in communication with the two cylinders 1 and 2 through passages 20 and 21. The valve 17 is formed with an angle passage providing two intersecting or communicating ports 22 and 23, which coöperate with the said port in the valve-seat and the said passages leading to the cylinders to control communication between said cylinders and between the larger cylinder and the atmosphere. As shown in Fig. 3, when the valve-handle 18 is moved outward at right angles to the position shown in Fig. 1, the ports 22 and 23 are brought in communication with the passage 21, thus connecting cylinder 2 with the atmosphere. When the valve-handle 18 is turned to the right or to a position diametrically opposite that shown in Fig. 1, the ports 22 and 23 coincide with the passages 20 and 21, thus bringing the two cylinders in communication.

The operation is as follows: At the outset of the operation of inflating a tire with air the valve 17 is adjusted to the position shown in Fig. 4, thus opening communication between the two cylinders, and the handle 10 is operated to communicate motion to both plungers, whereby air is forced directly from the cylinder 1 to the nipple through passage 15 and from cylinder 2 through the valve and passages 20 and 21 into cylinder 1, and thence through passage 15 to the nipple, whereby a large supply of air will be forced into the tire upon each working stroke of the pump. When the pressure within the tire nears the maximum desired and the pump becomes difficult to operate, then the valve is turned to the position shown in Fig. 3, from which it will be seen that the cylinder 2 is brought into direct communication with the atmosphere, so that as the pump is operated the air from cylinder 2 will be forced out through the passage 19, while only the air from cylinder 1 will be supplied to the tire through the passage 15 and nipple 6. Hence it will be observed that as there is no resistance to the movement of the plunger in cylinder 2 and as the smaller cylinder 1 only is in working operation the pump may be operated with less power than if both cylinders were in use and that at the same time a smaller amount of air will be supplied to the tire, thereby enabling the operator to graduate the amount of air forced into the tire until the desired pressure is reached. By this means the objections heretofore mentioned are overcome and the operator is enabled to work the pump at less expenditure of energy and to regulate the supply of air to the tire with the utmost nicety, thereby obviating all liability of a greater pressure being supplied to the tire than the latter can stand.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. An air-pump having two or more cylinders, a discharge-outlet in communication with one of said cylinders, and means for connecting the other cylinder with the atmosphere or with the first-named cylinder, substantially as described.

2. In an air-pump, the combination of two or more cylinders, a discharge-passage in communication with one of said cylinders, and a valve for connecting the other cylinder and the atmosphere, and for opening communication between both cylinders or closing communication between the cylinders, substantially as described.

3. An air-pump having means for supplying two determined different volumes with means for combining said volumes and conducting the same to a common discharge, or conducting one of said volumes only to said discharge, substantially as specified.

4. In an air-pump, the combination of cylinders, a base therefor provided with a discharge-passage in communication with one cylinder, and having a valve-chamber communicating by passages with both cylinders and the atmosphere, and a ported valve coöperating with said passages to connect the two cylinders or to disconnect them and connect the other cylinder with the atmosphere, substantially as shown and described.

In testimony whereof I have hereunto set my hand in the presence of two subscribing witnesses.

JOHN H. BURKHOLDER.

Witnesses:
Geo. A. Nicol,
Harvey D. Fike.